United States Patent [19]

Kawabata et al.

[11] 4,419,574

[45] Dec. 6, 1983

[54] FOCUS DETECTING DEVICE WITH VARYING PITCH CYLINDRICAL LENS ELEMENT

[75] Inventors: Takashi Kawabata, Kamakura; Nobuhiko Shinoda; Shinji Sakai, both of Tokyo; Takao Kinoshita, Tokyo, all of Japan

[73] Assignee: Canon Kabushiki Kaisha, Japan

[21] Appl. No.: 282,605

[22] Filed: Jul. 13, 1981

[30] Foreign Application Priority Data

Jul. 18, 1980 [JP] Japan .................... 55-101517[U]

[51] Int. Cl.³ ................................ G01J 1/36
[52] U.S. Cl. ........................... 250/204; 250/216; 350/433
[58] Field of Search .......... 250/201, 204, 216, 578; 354/25 R; 350/433, 483

[56] References Cited

U.S. PATENT DOCUMENTS 3,917,414  11/1975  Geis et al. ................. 350/433
4,185,191  1/1980  Stauffer ..................... 250/204

*Primary Examiner*—David C. Nelms
*Attorney, Agent, or Firm*—Toren, McGeady and Stanger

[57] ABSTRACT

In the disclosed focus detecting system, the focusing condition of an objective lens relative to an object is determined by a number of pairs of radiation sensitive elements arranged in a linear array, and a number of lens elements arranged in a linear array corresponding to the linear array of the pairs of radiation sensitive elements. Each lens element is disposed so that one radiation sensitive element in each pair of radiation sensitive elements is arranged to cause one radiation sensitive element in each pair of radiation sensitive elements to receive radiation from a first portion of the objective lens and to cause the other radiation sensitive element to receive radiation from a second portion of the objective lens. The plural lens elements assume the form of a plurality of cylindrical lens elements arranged in a linear array corresponding to the linear array of the pairs of radiation sensitive elements with each of the pitches between successive cylindrical lens elements varying along the longitudinal direction of the cylindrical lens element.

3 Claims, 6 Drawing Figures

(a)      (b)

FOCUS DETECTING DEVICE WITH VARYING PITCH CYLINDRICAL LENS ELEMENT

BACKGROUND OF THE INVENTION

1. Field of the Invention

This invention relates to a focus detecting device of the TTL (Through The Lens) type using a plurality of radiation sensitive elements in combination with a plurality of lens elements.

2. Description of the Prior Art

It is known in the art to provide a focus detecting device of the TTL type in the form of a radiation sensitive element arranged in a position optically equivalent to the position of the prescribed focal plane and operating to detect the degree of sharpness of an image formed on said radiation sensitive element, from which information representing the focusing condition of an image forming optical system is obtained. This form, because it largely depends upon the sensitivity of the radiation sensitive element, has many drawbacks.

On the other hand, as shown in U.S. Pat. No. 4,185,191 ("Range Detection System" by N. L. Stauffer, filed Jun. 5, 1978, patented Jan. 22, 1980) it is already known to provide a focus detecting device in which a number of lens elements are located adjacent to the prescribed focal plane of an image forming lens. For every one of these lens elements a respective pair of radiation sensitive elements arranged so that ones of the above-described radiation sensitive elements in each pair are made to receive light after having passed through one of two pupil openings symmetric to each other with respect to the optical axis in the above-described image forming lens at any time. The others of each pair of radiation sensitive elements are made to receive light after having passed through the other pupil opening at any time. The focusing condition of the above-described image forming lens to the object is detected by comparing the output of a group of those of the radiation sensitive elements which receive light from the one pupil opening with the output of another group of the other radiation sensitive elements which receive light from the other pupil opening, particularly on the basis of the phase relation of the both outputs.

This device of U.S. Pat. No. 4,185,191, unlike the before-mentioned image sharpness detection type, is of the type where the mutual positional relationship of the two images is detected. But, here, to realize such device, there are ever so many more requirements left still unfulfilled. For example, in such construction of the device as described above, for assurance of a sufficient performance and detection accuracy of the device, the plurality of lens elements and the plurality of radiation sensitive elements must be adjusted in position with high precision. Moreover, all the lens elements in the unit must be made up to precise tolerances on the order of $\mu$m. Further a measure to meet the influence of variation of the ambient temperature must be taken into account. That is, in general, the array of the plurality of lens elements is manufactured from a transparent acrylic or other suitable synthetic resin plate with a great number of lenslets formed in one surface thereof, and, because of the fact that the acrylic or synthetic resin material is particularly susceptible to the influence of deformation due to the temperature variation, a counter-measure to it must be taken.

SUMMARY OF THE INVENTION

With the foregoing in mind, the present invention has for its general object to provide an advantageous improvement particularly in the focus detecting device using a plurality of radiation sensitive elements in combination with a plurality of lens elements for the purpose of easily obtaining a adequate performance and detection accuracy of the device.

Another object of the present invention is to provide a more advantageous improvement which makes the precise position adjustment between the above-described plurality of lens elements and the plurality of radiation sensitive elements more easily possible, while nevertheless the manufacturing tolerance of the lens elements may be reduced, and therefore which can make a cost down.

A further object of the present invention is to provide an advantageous improvement which makes possible a very simple relative position adjustment between the above-described plurality of lens elements and the plurality of radiation sensitive elements, so that the precise position adjustment between the both can be easily assured.

Yet another object of the present invention is to provide a more advantageous improvement which, particularly when applied to the above-described plurality of lens elements congregatively on the surface of a synthetic resin substrate or like and susceptible to the influence of deformation or the like by temperature variation, adequately overcomes the influence of temperature variation.

Another object of the present invention, concomitant particularly with the last named object, is to provide an advantageous improvement which can maintain the stabilized performance and precision by its automatic compensation effect to the temperature change.

To these objects, according to the present invention, the focus detecting device using a plurality of lens elements arranged in a linear array so that the two of the light beams going to the prescribed focal plane of an image forming optical system which come from respective two pupil openings lying in symmetry to each other with respect to the optical axis are selectively focused on a plurality of radiation sensitive elements arranged in a position almost equivalent to the position of the prescribed focal plane is constructed such that the above-described plurality of lens elements is composed of all cylindrical lens elements in a lenticular plate that is the congregation of cylindrical lens elements. The pitch of each cylindrical lens element spacing is varies in the longitudinal direction of said cylindrical lens element.

Here, in one embodiment of the present invention to be described more fully later, the above-described plurality of radiation sensitive elements are arranged linewise, while the above-described lenticular plate is arranged so that the array of the cylindrical lens elements corresponds to the array of the radiation sensitive elements. And, by the relative position adjustment between said lenticular plate and the array of radiation sensitive elements and particularly along the longitudinal direction of the cylindrical lens elements it becomes more easily possible to precisely adjust the position between the radiation sensitive elements and the lens elements. This lowers the manufacturing tolerance of the lens elements and the price.

In another embodiment, the above-described lenticular is relatively fixed at a predetermined point to the array of radiation sensitive elements. As a result, for example, even when the temperature changes with some deformation of each cylindrical lens element in the lenticular plate along its array direction, a further deformation in the direction perpendicular to its array direction occurs so that the concurrent displacement produces an automatic compensation effect. Thus, the stabilization of the performance and precision against the temperature change can be always assured.

These and other objects, features and advantages of the present invention will become apparent from the following detailed description of embodiments thereof taken with reference to the accompanying drawings.

BRIEF DESCRIPTION OF THE DRAWINGS

The present invention will next be described in connection with preferred embodiments thereof by reference to the accompanying drawings.

DETAILED DESCRIPTION OF THE PREFERRED EMBODIMENTS

Figure 1:
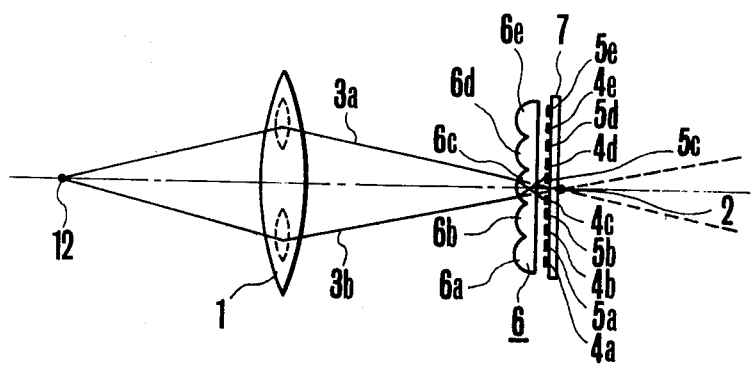
FIG. 1 is a schematic diagram considered to explain the principles of focus detection of the focus detecting device disclosed in the above-cited U.S. Pat. No. 4,185,191.
Figure 2:
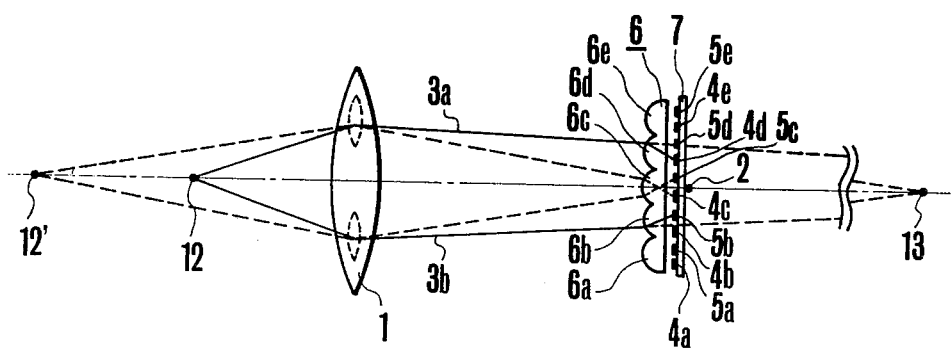
FIG. 2 is a similar diagram showing a focusing condition of the image forming lens when the position of sharp focus is shifted behind the prescribed focal plane (that is, far focus condition).

The following explains the focus detecting device disclosed in the above-cited U.S. Pat. No. 4,185,191. In FIGS. 1 and 2, an image forming lens 1, for example, a photo-taking lens in the art of cameras is used to focus on a prescribed focal plane 2 corresponding to the film plane in the camera. Rays of light 3a and 3b emanating from a point of intersection of an object 12 and an optical axis 0 of the lens 1 pass through two imaginary pupil openings 1a and 1b symmetric to each other with respect to the optical axis 0 of the lens 1. A lens plate 6 a linear array of a plurality of lenses 6a to 6e; is located before a radiation sensitive element substrate 7 on which a plurality of radiation sensitive elements 4a to 4e and 5a to 5e are alternately arranged. The radiation sensitive elements 4a to 4e and 5a to 5e are arranged in one pair-to-one element relation to the lens elements 6a to 6e of the lens plate 6. This plurality of radiation sensitive elements may take the form of the radiation sensitive portions of a photosensor device such as CCD and BBD.

This focus detecting device operates as follows.

FIG. 1 shows an image forming conditions for sharp focus. A light bundle from the object 12 is focused on the prescribed focal plane 2. In the same drawing, for example, one pair of radiation sensitive elements 4c and 5c are arranged to receive light from the imaginary pupil openings 1a and 1b of the image forming lens 1 respectively by one lens element 6c of the lens plate 6 arranged in front of that pair of radiation sensitive elements 4c and 5c.

In this state, light from the point of intersection of the object 12 and optical axis 0 is focused on the element 4c in the group of radiation sensitive elements 4a to 4e and also on the elements 5c in the group of radiation sensitive elements 5a to 5e, for the image position in each radiation sensitive element group is in prescribed correspondence relationship. Also, further, at this time, the other portions of the object 12 are imaged likewise by the other lens elements 6a, 6b, 6d and 6e of the lens plate on the respective different radiation sensitive element pairs. Hence, when the outputs of the both groups of radiation sensitive elements are read out, the phases of these output signals are in predetermined correspondence relation (in this case, coincidence relation).

Again, the output signals from the respective radiation sensitive element groups are almost similar to each other in waveform, provided that the radiation sensitive elements are sufficiently small, and very large in number and arranged adjacent to one another.

Next, FIG. 2 shows a condition where the image position by the image-forming lens 1 lies in a plane 13 behind the prescribed focal plane 2, that is, the image-forming lens 1 is focused on a farther object 12' than the object 12 (far focus).

In the same drawing, a ray of light 3a after having emanated from the center of the object 12 passes through the imaginary pupil opening 1a and is focused by the lens element 6b of the lens plate 6 onto the radiation sensitive element 4d, and a ray of light 3b which passes through the imaginary pupil opening 1b of the lens 1 is also focused by the lens element 6b onto the radiation sensitive element 5b. Similarly, rays of light from the other portions of the object 12 are focused on the radiation sensitive elements lying in the shifted positions from the state of FIG. 1, so that the phase relation of the output signal of the radiation sensitive element group 4a to 4e to the output signal of the radiation sensitive element group 5a to 5e is deviates from that of FIG. 1 (that is, out of coincidence). Moreover, it is between the near focus and the far focus that the direction of deviation of the phase of the output signal of the radiation sensitive element group is reversed.

Therefore, upon inspection of whether or not a deviation of the phases of the outputs of the radiation sensitive element groups 4a-4e and 5a-5e relative to each other is present, it is possible to detect the focusing condition of the image forming lens 1 to the object 12.

Figure 3:
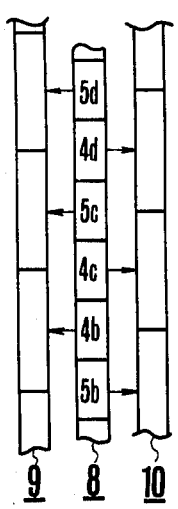
FIG. 3 is a schematic diagram considered to explain the transfer method of signals in a photo-sensor device.

FIG. 3 schematically shows the construction of the radiation sensitive element groups 4a-4e, 5a-5e of FIG. 2.

A light receiving portion 8 of a photosensor device such as CCD includes the radiation sensitive element groups 4a-4e and 5a-5e of FIG 2. Transfer portions 9 and 10 successively transfer the output signals of the radiation sensitive elements 4a-4e, 5a-5e of the light receiving portion in each group. As shown in FIG. 3, the transfer portion 9 is connected to the outputs of the radiation sensitive elements 4a-4e, and the transfer portion 10 to the radiation sensitive elements 5a-5e. When the outputs of the both transfer portions 9 and 10 are read out time sequentially in the same direction, nearly continuous signal waveforms are obtained, and the both waveforms are almost similar to each other. It is noted that, as has been mentioned above, the phases of the both waveforms vary depending upon the focusing condition of the image forming lens 1 to the object 12.

Now, in the focus detecting device of such construction as described above, to fully guarantee the performance of the device and the precision accuracy of detection, it is prerequisite that a precise position adjustment between each lens element 6a, 6b, ..., 6e and each radiation sensitive element pair 4a-5a, 4b-5b, ..., 4e-5e is established, and that each of the lens elements 6a, 6b, ..., 6e be built up to very high tolerances. These are attended with all sort of difficulties.

The following are advantageous improvements of the present invention which can fully eliminate such difficulties, explained in connection with embodiments thereof.

As shown in FIG. 4a, according to the present invention, instead of the above-described lens plate 6 having the linear array of a plurality of lens elements 6a–6e, there is provided a lenticular plate 16 having a linear array of cylindrical lens elements 16a–16f, each cylindrical lens element 16a, ..., 16f serving as each lens element 6a, ..., 6e.

Here, as shown in FIG. 4(b), the pitch of every cylindrical lens element spacing is the same and is made to continuously decrease (pitch d→pitch d', d>d') at a constant rate as it goes along the longitudinal direction of the cylindrical lens element, that is, to the right as viewed in the drawing.

Therefore, when the pitch of each cylindrical lens element 16a–16f is to be matched to the pitch of each radiation sensitive element 4a–5a, 4b–5b, ..., 4f–5f, it is possible regardless of the presence of some difference between the pitch of the cylindrical lens element and the pitch of the radiation sensitive element from unit to unit to carry out the precise position adjustment very easily, since the operator needs only to shift either one of the lenticular plate 16 and the photo-sensor device 8 to the right or left by an adjustment control mechanism (not shown).

Figure 4:
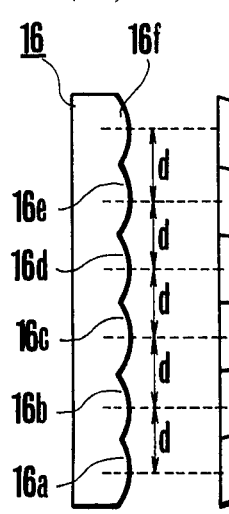
FIGS. 4a, 4b, and 5 are schematic diagrams showing two embodiments of the present invention.
Figure 4:
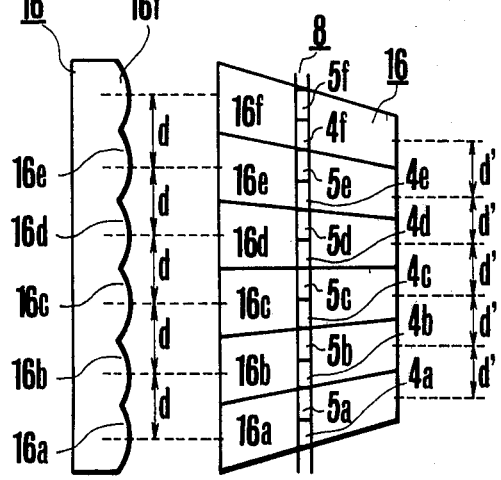
Figure 5:
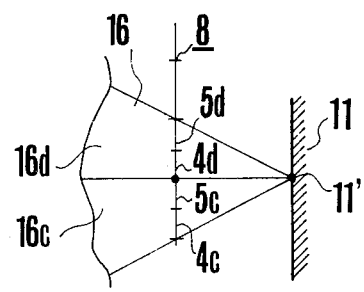

Next, FIG. 5 shows another embodiment of the present invention where the same reference numerals have been employed to denote the similar parts to those shown in FIG. 4.

Member 11 is a stationary member on which the photosensor device is mounted. The lenticular plate 16 is affixed at its one end to said stationary member 11 at a portion 11' thereof, and the other end is made movable.

Another feature is that the pitch of the lens element spacing of the lenticular plate 16 is continuously varied along the longitudinal direction of the lens element likewise as in FIG. 4.

In this embodiment, even when the lenticular plate 16 is formed with a synthetic resin such as acrylic of large thermal expansion coefficient, the pitch shift from the light receiving portion 8 resulting from the thermal expansion or shrinkage can be automatically compensated for.

That is, if the light receiving portion 8 hardly changes its dimensions by expansion or shrinkage even when the temperature changes, and in contrast to this, the lenticular plate 16 expands or shrinks, it occurs that with the optical center of the radial cylindrical lens elements fixed at the points 11' even when each cylindrical lens element expands, the resulting relative pitch change is compensated for by the expansion of the cylindrical lens element to the left as viewed in FIG. 5. Thus, the pitch relation to the light receiving portion 8 remains unchanged.

It should be pointed out that similarly, the change of the dimensions of the sensor device or package with the change of the temperature or humidity can be also compensated for easily to maintain the constant relative position provided that a stationary point equivalent to the point 11' is set suitably, and the sufficient accuracy can be also guaranteed.

It will be appreciated that the present invention is to provide a focus detecting device in which the light bundle going from an image forming optical system to the prescribed focal plane is focused by a plurality of lens elements onto the corresponding radiation sensitive element pairs to effect focus detection and which enables an easy position adjustment between the lens element and the radiation sensitive element and even after the adjustment has been once established, is hardly susceptible to the influence of temperature change.

What is claimed is:

1. In a focus detecting system for detecting the focusing condition of objective lens means to an object, comprising:

a plurality of pairs of radiation sensitive elements arranged in a linear array; and a plurality of lens elements arranged in a linear array corresponding to the linear array of said pairs of radiation sensitive elements, each lens element being arranged to cause one radiation sensitive element in each pair of radiation sensitive elements to receive radiation from a first portion of said objective lens means, and to cause the other radiation sensitive element to receive radiation from a second portion of the objective lens means, the improvement characterized in that said plurality of lens elements assume the form of a plurality of cylindrical lens elements arranged in a linear array corresponding to the linear array of said pairs of radiation sensitive elements, each of the pitches between the successive cylindrical lens elements varying along the longitudinal direction of said cylindrical lens element.

2. The improvement according to claim 1, wherein the relative positional relationship between said array of cylindrical lens elements and said array of radiation sensitive elements is adjustable along the longitudinal direction of said cylindrical lens elements.

3. The improvement according to claim 1, wherein said array of cylindrical lens elements are positioned with a portion thereof in fixed relation with reference to said array of radiation sensitive elements.

* * * * *